Figure 1:
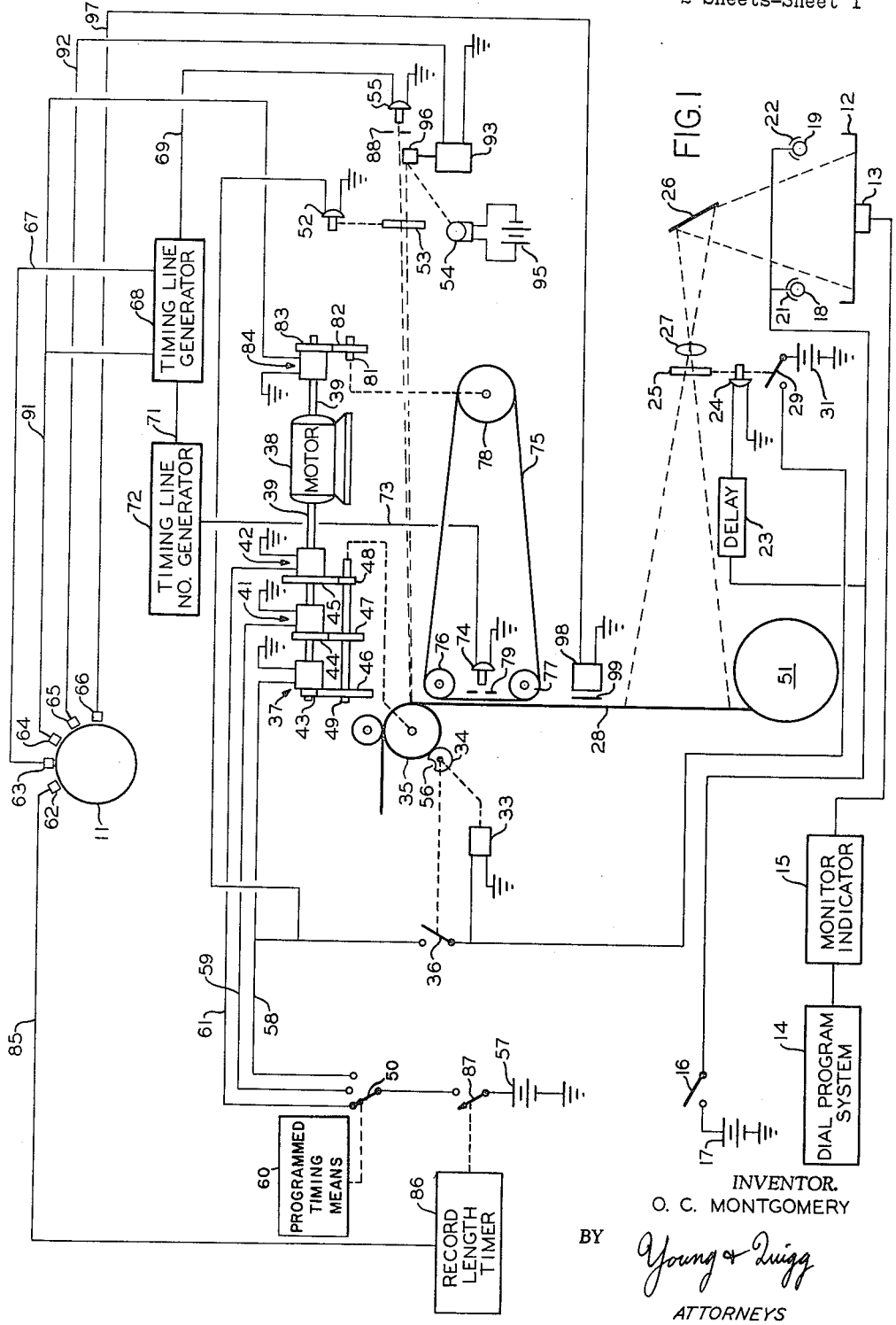

3,187,336
AUTOMATIC CAMERA
Orin C. Montgomery, Bartlesville, Okla., assignor to Phillips Petroleum Company, a corporation of Delaware
Filed Apr. 23, 1962, Ser. No. 189,385
7 Claims. (Cl. 346—109)

This invention relates to method and apparatus for recording electrical signals on photographic film or paper. In one aspect the invention relates to an automatic camera for use in connection with the analysis of records secured in seismic exploration. In another aspect the invention relates to apparatus and method for automatically recording identification data as well as the electrical signals to be recorded. In another aspect the invention relates to means and method for producing timing lines on a photographic record. In another aspect the invention relates to method and apparatus for identifying selected timing lines. In another aspect the invention relates to method and apparatus for automatically starting and stopping the recording of electrical signals. In a still further aspect the invention relates to method and apparatus for varying the speed of movement of a photographic record during the recording thereon of a signal.

It has become customary in seismic exploration as well as other forms of geophysical exploraiton to obtain information on subsurface formations by passing signals through the formation and recording the transmitted signals. Such recordings are generally made on magnetic recording means in order to provide records which can be later manipulated to obtain the desired information. It is often desirable to provide means for obtaining a visual record from the magnetic recording.

In accordance with the invention there is provided an improved automatic camera for obtaining a visual record of one or more electrical signals. The improved camera comprises means for recording identification data in addition to the signals to be recorded; means for recording timing lines; means for identifying selected timing lines, such as every 100 millisecond line; means for automatically starting and stopping the recording operation; means for changing the speed of movement of the recording medium during the recording operation; and/or means for checking the alignment between a plurality of signals.

Accordingly, an object of the invention is to provide an apparatus for producing a visual record of electrical signals. Another object of the invention is to provide an improved camera for recording seismic signals. A still further object of the invention is to provide an improved camera having means for varying the speed of the movement of the photographic recording means during recording of signals thereon. Another object of the invention is to provide a method and apparatus for identifying selected timing lines on a photographic recording of seismic data. Yet another object of the invention is to provide method and apparatus for recording identification data along with the signals to be recorded. A still further object of the invention is to provide method and apparatus for controlling the starting and stopping of the recording operation.

Other objects, aspects and advantages of the invention will be apparent from a study of the disclosure, the drawing and the appended claims to the invention.

Figure 2:
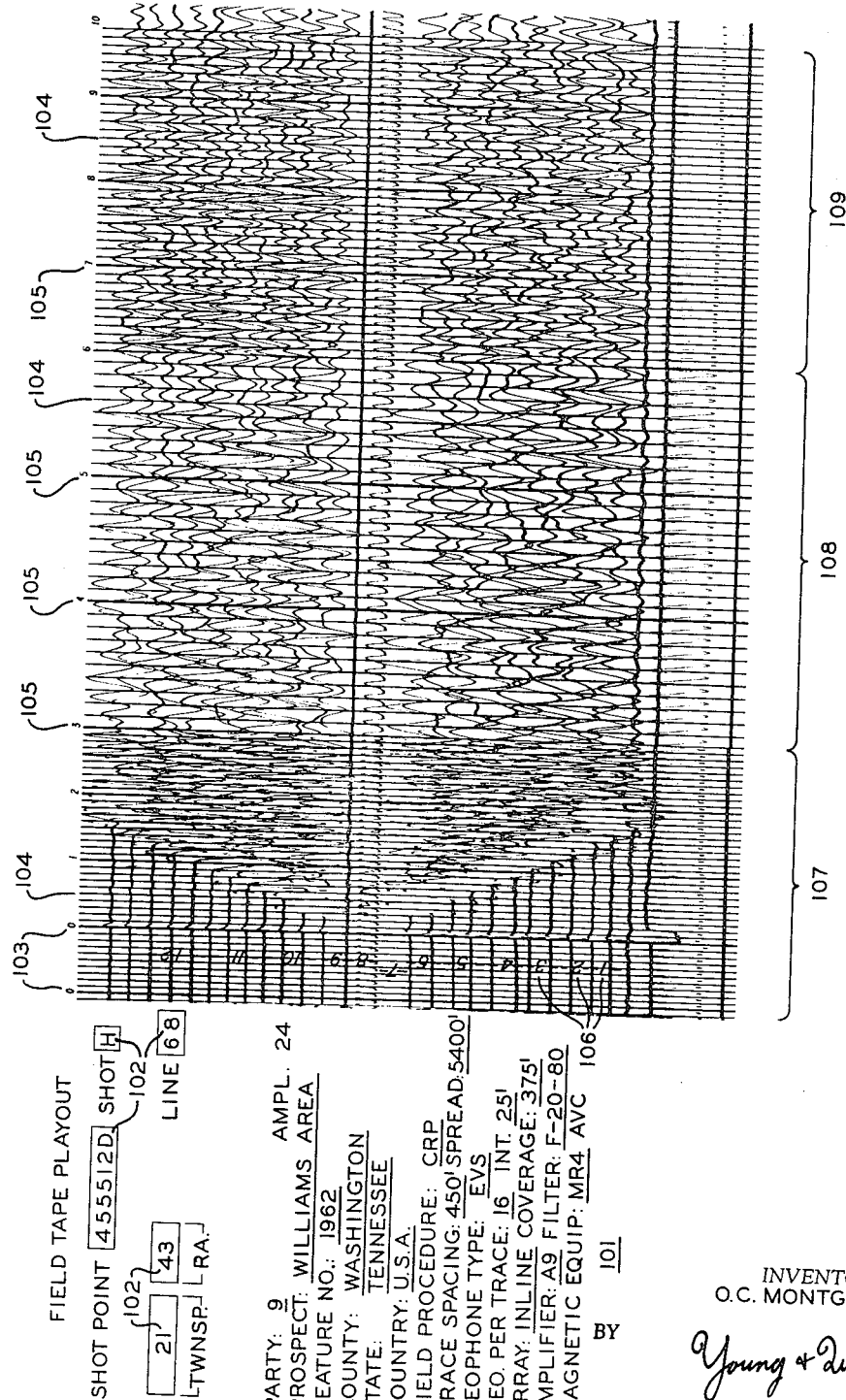

In the drawings FIGURE 1 is a schematic representation of an automatic camera in accordance with the invention, and FIGURE 2 is a pictorial representation of a recording which can be made by the automatic camera of FIGURE 1.

Referring now to FIGURE 1, the magnetic tape containing the seismic signals is placed on drum 11. A plate containing the title or identification information corresponding to the particular seismic recording is inserted in holder 12. The plate contains one or more openings corresponding to the location of indicator 13. The information desired to be displayed on indicator 13 can be introduced into dial program system 14 by suitable means, such as a telephone dial, and transmitted through monitor indicator 15 to indicator 13. Switch 16 is closed by the operator to connect power supply 17 to lamps 18 and 19 which are provided with suitable reflectors 21 and 22, respectively. Switch 16 also connects power supply 17 through delay 23 to solenoid 24. After a predetermined time, determined by delay 23 to provide time for lamps 18 and 19 to warm up, solenoid 24 momentarily actuates shutter 25. When shutter 25 is in the open position and image of the data plate in holder 12 is reflected from mirror 26 and transmitted through lens 27 and shutter 25 to film 28.

At the same time that solenoid 24 actuates shutter 25, solenoid 24 also actuates switch 29 to connect power supply 31 across the terminals of solenoid 33 and through normally closed switch 36 across the termianls of electrical clutch coupler 37. Upon the closing of switch 29 solenoid 33 positions a measuring wheel 34 against paper drive roller 35.

Synchronous motor 38 is actuated with 60 cycle A.C. voltage to drive shaft 39 at a constant speed. A plurality of electric clutch couplers 37, 41 and 42 are mounted on shaft 39. Gears 43, 44 and 45 are associated with clutch couplers 37, 41 and 42, respectively. Each clutch coupler comprises a stationary housing which is separate from shaft 39 and contains the electrical winding, and a rotor which is fixed with respect to shaft 39. Gears 43, 44 and 45 have a larger internal diameter than the diameter of shaft 39 and thus are not rotated directly by shaft 39. Upon the application of a voltage to the electrical winding in one of the clutch couplers, a magnetic field is established which attracts the associated gear to the rotor causing the gear to rotate with the rotor. Clutch couplers 37, 41 and 42 can be any suitable device, such as electric clutch-couplings, Models SF–160, SF–250 or SF–400, manufactured by Warner Electric Brake and Clutch Company, Beloit, Wisconsin. Gears 46, 47 and 48 are mounted on shaft 49 and correspond to gears 43, 44 and 45 is connected to paper drive roller 35. Gears 43 and 46, 44 and 47 and 45 and 48 are designed to produce various ratios between the rotation of shafts 39 and 49. Thus, when one of the clutch couplers is actuated, paper drive roller 35 is rotated by motor 38 at a speed determined by which clutch coupler has been actuated.

Thus, when switch 29 is closed, clutch coupler 37 is actuated to cause gear 43 to rotate with shaft 39, thus driving gear 46 and shaft 49 and causing the rotation of paper drive roller 35 to pull the exposed film away from film magazine 51. The closure of switch 29 also actuates solenoid 52 to close shutter 53 to prevent the exposure of the film 28 to lights 54 and 55. When the film has been moved a predetermined distance of sufficient length to move that portion which was exposed to the identification data past the point of exposure for lights 54 and 55, measuring wheel 34 is rotated to a position such that notch 56 is adjacent paper drive roller 35, thus permitting measuring wheel 34 to move closer to roller 35. This movement of wheel 34 towards roller 35 actuates normally closed switch 36 to an open position, thus deactuating clutch coupler 37. Switch 16 can be moved to an open position manually or be automatically opened after a predetermined time interval. Switch 50 is provided to connect power supply 57 to one of the electric clutch coupler 37, 41 and 42 through lines 58, 59 and 61, respectively. Switch 50 can be manually operated or can be programmed by a timing means 60 to change the speed of movement of film 28 at preselected time intervals during the recording operation.

Magnetic drum 11 is provided with a plurality of take-off means 62–66. A timing signal, which can be recorded on magnetic drum 11 or generated by a tone wheel, is transmitted through take-off means 63 and line 67 to timing line generator 68. The timing signal can be any suitable signal much as 100 c.p.s. signal. Timing line generator 68 produces an output pulse for each cycle of the timing signal and the output pulses are transmitted through line 69 to actuate lamp 55. Lamp 55 can be provided with a light shield 88 having a slit therein to confine the light beam to a line. A condensing lens can be used instead of light shield 88. Timing line generator 68 also comprises a suitable counter, such as a binary counter, such as a binary counter, to produce an output pulse of longer duration at preselected intervals, such as every tenth cycle of the timing signal. An output of timing line generator 68 is also transmitted through line 71 to an input of timing line number generator 72, which comprises suitable counting means such as a binary counter. Upon the occurrence of a predetermined number of cycles of the timing signal, timing line number generator 72 passes an output pulse signal through line 73 to actuate lamp 74. An opaque strip of film 75 containing transparent numbers in sequence is passed between lamp 74 and film 28 by means of rollers 76 and 77 and drive roller 78. A light shield 79 containing an opening therein is mounted between film 75 and lamp 74 to prevent the exposure of more than one number at a time. Drive roller 78 is driven by shaft 81 which in turn is driven by gear 82. Gear 82 is driven by gear 83 upon the actuation of clutch coupler 84. Drive roller 78 can be rotated against the action of a spring to provide for accurate positioning of film 75 regardless of the length of recording time.

When it is desired to visually record the magnetic signals on drum 11, take-off means 62–66 are actuated. Regardless of the position of drum 11 upon the actuation of the take-off means, no recording is made until a "record start" signal passes adjacent take-off means 62. The "record start" signal is transmitted through line 85 and record length timer 86 to close switch 87 located between power supply 57 and switch 50. The clutch coupler corresponding to the line to which switch 50 is set is then actuated to drive paper drive roller 35 at a constant speed. A short time interval later a "zero time" signal will pass adjacent take-off means 64. The "zero time" signal will be transmitted through line 91 to energize timing line generator 68 and clutch coupler 83. At the same time the seismic signals are reproduced by take-off means 65 and transmitted through line 92 to galvanometer bank 93. While for the purposes of simplicity only one take-off means 65 and only one galvanometer 93 is illustrated, it is obvious that a plurality of take-off means and galvanometers corresponding to the number of signals to be recorded can be utilized. The galvanometers 93 can be adjusted to provide the desired spacing of traces on film 28 and to provide the desired amplitude control. The light from lamp 54, which is connected across power supply 95, is reflected from galvanometer mirror 96 and transmitted through shutter 53 to film 28. Timing light 55 is positioned with respect to galvanometer mirror 96 such that the light transmitted from each corresponding to a particular time will have approximately the same angle of incidence to film 28 and strike film 28 at the same position.

A plurality of time alignment signals corresponding to each seismic signal or to each group of seismic signals are reproduced by take-off means 66 and transmitted through line 97 to light bank 98. An opaque film 99 containing transparent numbers is positioned between light bank 98 and film 28. Light bank 98 contains one light source for each number and each number corresponds to each seismic signal or group of seismic signals. Thus, if all the seismic signals or groups of seismic signals are correctly time correlated, all of the corresponding lights in light bank 98 will be actuated simultaneously. If any one of the seismic signals or group of seismic signals has an incorrect time correlation the corresponding lamp will be lighted at a time different from the other lamps, thus producing a record on film 28 of the incorrect time correlation and the amount thereof. At the expiration of a predetermined time interval after the recipt of the "record start" signal, record length timer 86 opens switch 87 to terminate the recording operation. Timer 86 can be any suitable timing means.

Referring now to FIGURE 2 there is shown a pictorial representation of a recording produced in accordance with the invention, comprising identification data 101 which includes the visual output 102 of indicator 13, a plurality of "zero" lines 103, timing lines 104, timing line identification number 105, time alignment signals 106, and record sections 107, 108, and 109 corresponding to various speeds. Section 107 was made at a fast speed, while section 108 was made at slow speed, and section 109 was made at a medium speed. The recording of the time of firing the shot coincides with the last "zero" line, and thus provides accurate correlation between the timing lines 104 and the seismic traces. As readily seen from the time alignment signals 106, the signal or group of signals corresponding to number 7 is not in complete alignment with the remaining signals; the amount of the deviation can be determined by correlating the deviation with the timing lines 104.

Reasonable variation and modification are possible within the scope of the disclosure, the drawings, and the appended claims to the invention.

I claim:

1. Apparatus for visually recording an electrical signal comprising a photographic recording medium, a first light source, a mirror-supporting galvanometer positioned with respect to said first light source and said medium so that a beam of light from said first light source is reflected from said mirror to said medium, a synchronous motor driving a first shaft, a plurality of first gears loosely mounted on said first shaft, a second shaft, a plurality of second gears mounted on said second shaft and spaced from one another, each of said second gears engaging a respective one of said first gears, a plurality of clutch couplers each associated with a respective one of said first gears and adapted to cause the respective first gear to rotate with said first shaft, each of said clutch couplers being actuated by electrical coils, a recording medium drive roller for moving said medium relative to said galvanometer and said first light source so that said beam is deflected perpendicular to the direction of movement of said medium by the rotation of said mirror, means for rotating said roller responsive to the rotation of said second shaft, an electrical power supply, a first switch having a contactor and a plurality of contacts corresponding to the number of clutch couplers, means for connecting one terminal of said power supply to said contactor, means adapted to connect each of said contacts to a first terminal of a respective one of said electrical coils, and means for connecting each of the second terminals of said electrical coils to the second terminal of said power supply.

2. Apparatus in accordance with claim 1 wherein said means for connecting one terminal of said power supply to said contactor comprises a second switch and further comprises means for closing said second switch when it is desired to record said electrical signal on said recording medium and for opening said second switch at the expiration of a predetermined time interval.

3. Apparatus in accordance with claim 1 further comprising means for photographically recording title identification data on said recording medium, means for energizing one of said clutch-couplers to move that portion of the recording medium exposed to the title identification data past the point of exposure to said beam of light from said first light source, and means for shielding from said beam of light said portion of the recording medium exposed to said title identification data.

4. Apparatus in accordance with claim 3 further comprising means for deactuating said means for energizing after said recording medium has been moved a predetermined distance.

5. Apparatus in accordance with claim 1 further comprising a second light source, a source of timing pulses, means for actuating said second light source during each of said timing pulses, and means for confining the light beam from said second light source to a line perpendicular to the direction of movement of said recording medium.

6. Apparatus in accordance with claim 5 further comprising opaque means having transparent indicia therein, a third light source, means positioning said opaque means between said recording medium and said third light source, means responsive to said timing pulses for moving said opaque means relative to said third light source, and means for momentarily actuating said third light source upon the occurrence of a predetermined number of said timing pulses.

7. Apparatus in accordance with claim 1 further comprising means for producing a plurality of time alignment signals corresponding to each electrical signal being recorded on said medium, a plurality of lights corresponding in number to said plurality of said time alignment signals, means for applying a respective one of said plurality of said time alignment signals to each of said plurality of lights, opaque means positioned between said plurality of lights and said medium and having transparent indicia therein adjacent each of said plurality of lights whereby each of said plurality of lights is momentarily actuated by the respective time alignment signal to cause the reproduction on said medium of the corresponding indicia, the spaced relationship between such reproductions being indicative of the correlation of respective time of the electrical signals being reproduced thereon.

References Cited by the Examiner
UNITED STATES PATENTS

| | | | |
|---|---|---|---|
| 2,604,955 | 7/52 | Hawkins | 346—109 X |
| 2,697,648 | 12/54 | Kerr et al. | 346—33 |
| 2,707,524 | 5/55 | Montgomery | 346—33 X |
| 2,752,092 | 6/56 | McDona | 235—185 |
| 3,081,458 | 3/63 | Lee | 346—109 X |

LEO SMILOW, *Primary Examiner.*

LEYLAND M. MARTIN, *Examiner.*